United States Patent Office 2,782,203

Patented Feb. 19, 1957

2,782,203

AXAZOL-5-ONE COMPOUNDS

Gustav Adolf Weitnauer, Milan, Italy, assignor to Lepetit S. p. A., Milan, Italy, a corporation of Italy No Drawing. Application October 25, 1952, Serial No. 316,942

6 Claims. (Cl. 260—307)

The present invention relates to a series of new substituted oxazol-5-ones.

My new substituted oxazol-5-ones correspond to the following general formula

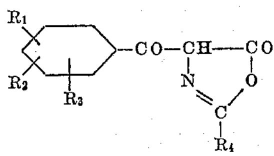

and as these substances are soluble in alkali, they may be written as well in their enolic form

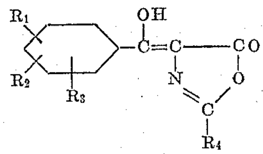

In these formulae $R_1$ and $R_2$ are the same or different and represent hydrogen, halogen, preferably chlorine or bromine, lower alkyl or lower alkoxy radicals, such as methyl, ethyl, propyl, isobutyl, amyl, methoxy, ethoxy, propoxy, etc.; while $R_3$ represents hydrogen or a nitro group, and $R_4$ may be phenyl, substituted or unsubstituted, lower alkyl or a halogenated lower alkyl radical, e. g. lower alkyl- or lower alkoxy-substituted phenyl, like p-methylphenyl, p-ethoxyphenyl; methyl, ethyl, isobutyl; and monchloro-, dichloro-, monobromo- and dibromomethyl, ethyl, propyl, etc.

The compounds embraced by the above formulae are useful as intermediates in the preparation of other compounds, including, in particular, compounds possessing antibiotic properties. When, for example, the componds of the above-indicated general formula are subjected to hydrolysis and hydrogenation, as described in my copending application Ser. No. 316,941, filed October 25, 1952, products of the following general formula are obtained:

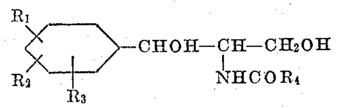

wherein $R_1$, $R_2$, $R_3$ and $R_4$ have the same significance as indicated above. As will be clear to those skilled in the art, in the case that $R_1$ and $R_2$ are hydrogen, $R_3$ is a nitro group in para position, and $R_4$ is the dichloromethyl group $CHCl_2$, the product represented by this last general formula is chloramphenicol, i. e. one of the most commonly used broad spectrum antibiotics.

These substituted oxazol-5-ones may be prepared by using as starting material the N-aliphatic acyl or N-aroyl, especially N-benzoyl, derivatives of glycine on the one hand and substituted or unsubstituted benzoic acid anhydrides or chlorides on the other hand.

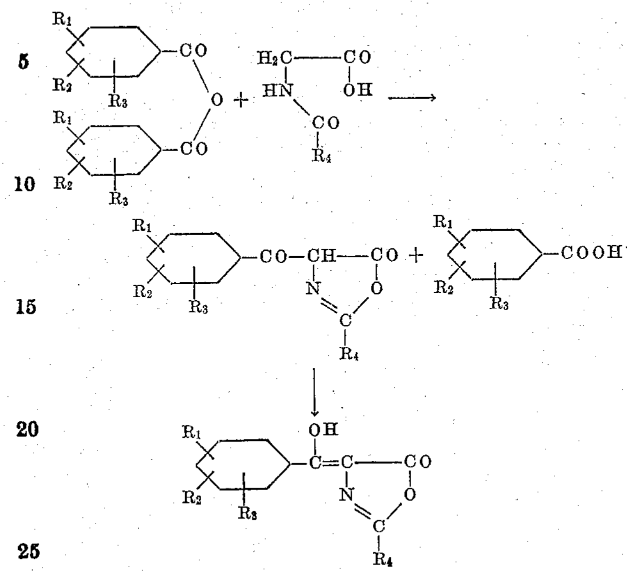

Substituted and unsubstituted benzoic acid anhydrides and N-substituted gylcines react easily together on heating, but unless special precautions are taken, the desired compounds are not formed since the 2-phenyl (or alkyl)-oxazol-5-one, the intermediate compound which is obtained by an internal anhydrification of the N-benzoyl or N-aliphatic acyl derivative of glycine with the benzoic acid anhydride as anhydrification agent, is rapidly destroyed by further heating with the reactants or even by a small amount of weak acids.

I have found that the desired reactions, that is, the internal anhydrification of the N-aliphatic acyl or N-benzoyl derivatives of glycine and the subsequent Claisen type of condensation between the active hydrogen in position 4 of the 2-phenyl (or alkyl)-oxazol-5-one and the benzoic acid anhydride or chloride, can easily be achieved without any substantial further destruction, and at mild reaction conditions, if the reaction is made to take place under basic conditions, as by employing an organic base as condensation catalyst, with or without an alkali metal acetate, or in the presence of an alkali metal salt of the N-substituted aminoacetic acid, or, preferably, by reacting an alkali metal salt of the N-substituted amino acid with the substituted or unsubstituted benzoic acid anhydride in the presence of an organic base. While various organic bases may be used, I have found that particularly good results from the standpoint of yield and purity of the products are obtained with pyridine and $\beta$-picoline.

The desired reaction is brought about by stirring for several hours a suspension of an alkali metal salt of the N-aliphatic acyl or N-benzoyl derivative of glycine with the calculated amount, or preferably with an excess, of the substituted or unsubstituted acid anhydride in the presence of an excess of the organic base, such as pyridine, preferably at temperatures ranging from 30° to 60° C. At higher temperatures the reaction proceeds more quickly but destruction of the desired product and side reactions than are more likely to set in.

Instead of reacting the alkali metal salts of the N-acyl derivatives of glycine with the benzoic acid anhydride in the presence of an organic base, one may also start from the intermediate compound, that is, a 2-phenyl(or alkyl)-oxazol-5-one, which can be obtained in different ways already known, and reacting this compound in the presence of pyridine with a substituted or unsubstituted benzoic acid anhydride or chloride. In such case, cooling of the reaction mixture will generally be desirable.

The compounds thus obtained are usually crystalline solids of a yellow to pinkish color. They are almost insoluble in water and ligroin, slightly soluble in ether, but fairly soluble in ethyl alcohol, dioxane, ethyl acetate and choroform. They are isolated from the reaction mixture by decomposing, after the reaction, the excess of the benzoic acid anhydride by addition of water and precipitating the desired product with acids. The product is separated from the benzoic acid and benzoic acid ester formed during the reaction, by their differential solubilities in ether or other solvents. The products may be purified by chromatography of their alkali metal salts, or to the same extent by precipitating them with acids from their alkali solutions.

The invention will now be further described in detail in the following examples which are illustrative only and are not to be considered as indicating the limits of the invention.

*Example 1*

A suspension of 35 g. of benzoic acid anhydride and 10 g. of the sodium salt of hippuric acid in 70 ml. of anhydrous pyridine is stirred at a temperature ranging from 35°–40° C. for about 10 hours. During that time the suspension becomes dark red and viscous.

10 ml. of ethyl alcohol are then added and, maintaining the temperature at 35° C., stirring is continued for half an hour. Then 500 g. of cracked ice are added and the solution is acidified to Congo-red with dilute hydrochloric acid (1:1) while being vigorously stirred. The solids which separate are extracted with ethyl acetate. The ethyl acetate extract is then extracted repeatedly with a sodium hydroxide solution (10%) until an extract shows no precipitation on acidification. The sodium hydroxide extracts are now combined and acidified to Congo-red and the yellow precipitate thus formed is filtered and washed with small portions of water. After drying it in a desiccator the product is treated with a mixture of equal parts of ethyl ether and petroleum ether. The residue is dissolved in a small quantity of sodium hydroxide solution, the sodium hydroxide extract is treated with a small portion of charcoal and then filtered. On acidification, filtration and drying in a desiccator, there is obtained the desired product of the formula:

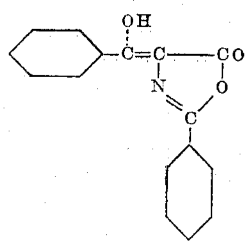

*Example 2*

A mixture consisting of 12 g. of N-acetylglycine, 46.5 g. of β-picoline, 84 g. of 3,5-dimethylbenzoic acid anhydride and 8 g. of sodium acetate, is stirred at a temperature ranging from 30°–40° C. for about 8 hours. The reaction product is then treated with 15 ml. of ethyl alcohol; stirring is continued and the temperature maintained at about 40° C. for a further half hour. After than, 500 g. of ice are added and the mixed solution is acidified to Congo-red by addition of dilute hydrochloric acid. The yellow-brown precipitate formed on acidification is filtered and washed with small portions of distilled water. The residual product on the filter is then extracted a number of times with ethyl acetate and the combined extracts are shaked repeatedly with a sodium hydroxide solution (10%) until a sample of the extract gives no more precipitation on acidification. These alkaline extracts are now combined and acidified to Congo-red with dilute hydrochloric acid (1:1) and the precipitate is filtered, washed with distilled water and dried in a desiccator. The dried solid is then treated with a mixture of equal parts of ethyl ether and petroleum ether. The residual product is dissolved in the minimum amount of a sodium hydroxide solution (10%), the solution is stirred with a small amount of charcoal, filtered, and the filtrate acidified with dilute HCl, and the resulting precipitate filtered and dried. The product has the formula:

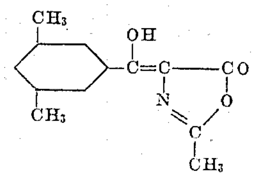

*Example 3*

A mixture composed of 9 g. of the sodium salt of N-dichloroacetyl-glycine, 71 g. of 3-bromo-4-nitrobenzoic acid anhydride and 80 ml. of anhydrous pyridine is stirred for about 12 hours keeping the temperature in the neighborhood of 35° C. The reaction product thus obtained is then submitted to the procedures described in the preceding Examples 1 and 2. There is obtained the desired compound of the formula:

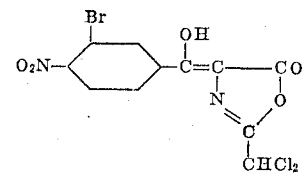

*Example 4*

A solution of 8.4 g. of 2-dichloromethyl-oxazol-5-one in 20 ml. of β-picoline is cooled to 0° C. and while being vigorously stirred and the cooling is continued, 9 g. of p-nitrobenzoyl chloride are added in small portions. The solution is maintained at 0° C. for another two hours; then it is poured into cracked ice and acidified with hydrochloric acid. The precipitate formed is filtered, washed with distilled water and dried in a desiccator. The product is the desired compound of the formula:

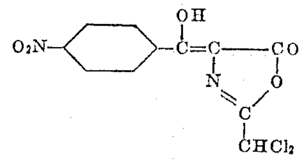

*Example 5*

16.1 g. of 2-phenyl-oxazol-5-one are dissolved in 40 ml. of anhydrous pyridine. The solution is stirred and cooled at 0° C. and, while maintaining the solution at this temperature and while stirring is continued, 14.0 g. of benzoylchloride are added in small portions. When the addition is completed, the solution is allowed to stand at the temperature of 0° C. for another two hours; the reaction product is then poured into 500 g. of cracked ice. It is acidified with HCl to cause precipitation. The precipitate is filtered, washed, and dried in a desiccator. It is the desired compound of the formula:

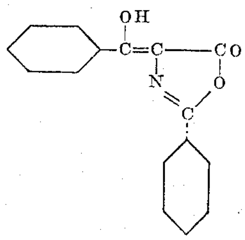

In place of the pyridine and β-picoline, other homologues of pyridine can be employed like the various collidines; there can also be employed piperidine and its homologues like pipecoline, lupetidine and copellidine. In general, liquid organic bases which act at the same time as the reaction solvent medium are preferred; but where a solid organic base is employed, an inert anhydrous common organic solvent for the base and for the reacting materials should be employed.

I claim:

1. A member of the class consisting of compounds of the formula

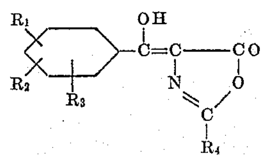

and their ketonic tautomeric isomers, wherein $R_1$ and $R_2$ are members of the group consisting of hydrogen, halogen, lower alkyl and lower alkoxy radicals, $R_3$ is a member of the class consisting of hydrogen and the nitro group, and $R_4$ is a member of the class consisting of phenyl, lower alkyl and halogenated lower alkyl radicals.

2. 2-phenyl-4-(α-hydroxybenzal)oxazol-5-one of the formula

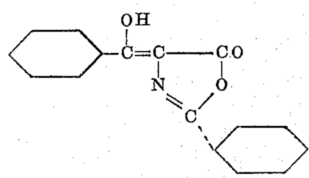

which can exist in a ketonic tautomeric form.

3. 2 - dichloromethyl - 4 - (α - hydroxybenzal)oxazol - 5-one of the formula

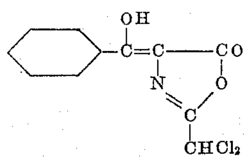

which can exist in a ketonic tautomeric form.

4. 2-methyl-4-(α-hydroxybenzal)oxazol-5-one of the formula

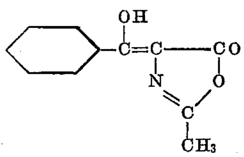

which can exist in a ketonic tautomeric form.

5. 2 - phenyl - 4 - (α - hydroxy - p - nitrobenzal) - oxazol-5-one of the formula

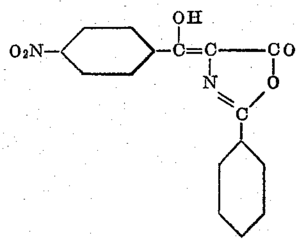

which can exist in a ketonic tautomeric form.

6. 2 - dichloromethyl - 4 - (α - hydroxy - p - nitrobenzal)oxazol-5-one of the formula

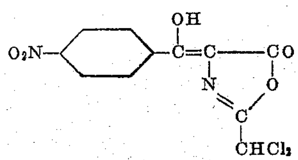

which can exist in a ketonic tautomeric form.

References Cited in the file of this patent

Tatsuoka et al.: "J. Pharm. Soc. Japan," vol. 71, No. 8 (August 1951), pp. 778–781.

Chemical Abstracts, vol. 46, p. 8050e (September 10, 1952). (Abstract of the above.)

Attenburrow et al.: "J. Chem. Soc." (London), 1948, pp. 310–318.